No. 832,706. PATENTED OCT. 9, 1906.
G. F. STURGESS.
VARIABLE SPEED AND BRAKE GEAR.
APPLICATION FILED SEPT. 28, 1904.
Fig. 1.
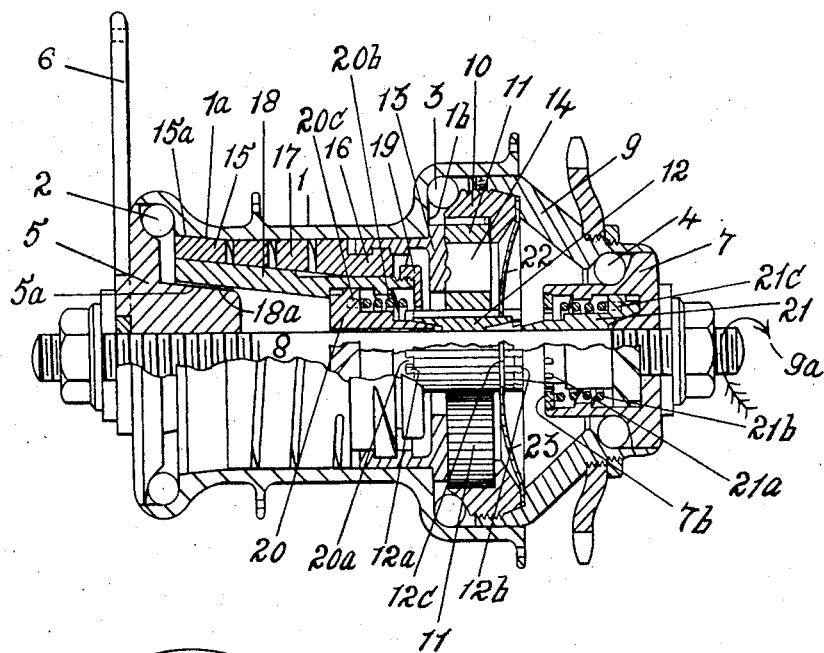
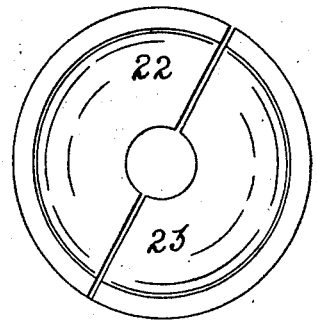
Fig. 2.
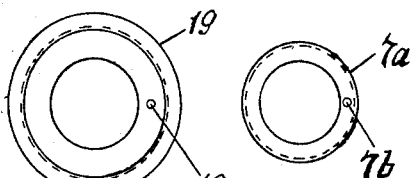
Fig. 3.　　Fig. 4.
Witnesses.
Thomas Scott.
Ernest Fell.
Inventor:- Geo. F. Sturgess.

UNITED STATES PATENT OFFICE.

GEORGE F. STURGESS, OF LEICESTER, ENGLAND.

VARIABLE-SPEED AND BRAKE GEAR.

No. 832,706.　　　　　Specification of Letters Patent.　　　　　Patented Oct. 9, 1906.

Application filed September 28, 1904. Serial No. 226,298.

*To all whom it may concern:*

Be it known that I, GEORGE FREDERICK STURGESS, a citizen of England, residing at Leicester, in the county of Leicester, England, have invented certain new and useful Improvements in Variable-Speed and Brake Gears; and I declare that the following is a full, clear, and exact description of the same.

The object is the transmission of variable power, flexible and without frictional waste of power, and to automatically transform the gear by the power-pressure.

It consists of a free hub-inclosed spring drive and brake band combined with that type of epicyclic differential gear that conveys power direct and frictionlessly by rotatively fixing the members together or transmits the power indirectly by frame-fixing a member without the frictional loss of power occasioned by the idly-running wheels observed in that class of variable gear in which the power is always indirectly transmitted through one or other of two sets of constantly-running gears, and a pressure-controlled right-and-left acting speed-changing clutch (hereinafter called the "transforming" device) adapted to automatically fix the said member and transform the movement from one speed to another speed. The cycle hub-gear shown in the drawings will serve to illustrate the adaptation of the invention for power transmission.

Figure 1 is a part sectional view of the power-transmitting hub complete. Fig. 2 is a flat view of the right-and-left acting spring-disk. Fig. 3 is a flat view of the coil-bar stop-nut. Fig. 4 is a flat view of the frame-fixed cone stop-nut.

The hub 1 overruns frictionally free of stopped parts upon races of balls 2 and 3. The race of balls 3 separates the hub-shell 1 and driving-ring 9, which may run frictionally free of frame parts upon a race of balls 4. The ball-cones 5 and 7 are screwed to the spindle, the whole being held to the cycle-framework by a stay 6 in the usual manner.

The spring drive and brake band or ring 17 has solid end rings 15 and 16 and is socketed on to a coned distending holder and is rotatively fixed by engagement of cone $15^a$ to socket $1^a$ for driving, or frame-fixed by engagement of socket $18^a$ with grip-cone $5^a$, the operations being performed by a driving-ring 13, which is shouldered to engage the face $1^b$ of the hub and is loosely screwed onto the drive and brake ring 17, which extends up to the stop-nut 19 under driving pressure and expands up the distending-cone 18 onto the bore-face of the hub under reverse or braking pressure in the usual manner.

Referring to the power or speed gear, power is conveyed from the driving-ring 9 to the driving-ring 13 direct or indirect by a sun-and-planet or epicyclic gear, of which 11 are the planet-wheels mounted on pivots 14 of the driving-ring 13. The teeth of the planet-wheels are in constant mesh with the teeth of the annulus 10 and the base-wheel 12, so that when the base-wheel 12 is rotatively fixed, as seen in Fig. 1, power is conveyed direct to the hub, the gear members driving solid with and at the same speed as the driving-ring 9. When the base-wheel 12 by engagement with the frame-fixed grip-cone 21 is locked or fixed with the cycle-frame, the power is transmitted through the planet-wheels 11 turning on their pivots 14 as they roll round the stopped base-wheel which drives the ring 13 and hub 1 at a less speed than the driving-ring 9. In either case upon stoppage of the driving-ring 9 the spring drive and brake ring 17 is balanced upon the grip-cone 5, leaving the hub 1 to overrun in either direction upon its races of balls entirely free of any frictional contact with stopped or fixed parts whatever.

Referring to the transforming device employed to rotatively fix or frame-fix the base-wheel 12, the wheel 12 is socketed to engage and balance on either rotatable grip-cone 20 or fixed cone 21, and to more securely lock them the wheel 12 is also provided with claw-teeth $12^a$ to engage coacting teeth $20^a$. Transforming-cone 20 is loosely screwed in a left-hand thread of the cone 17 and is capable under the application of reverse power-pressure of screwing the base-wheel 12 into engagement with frame-fixed cone 21 against the resistance of coil-spring $20^b$, fastened at one end in hole $20^c$ and at one end in hole $19^a$, which, when the back power is released, winds the cone 20 back to its initial position, (seen in Fig. 1,) leaving the base-wheel 12 fixed to the frame-fixed cone 21. Transforming-cone 21 is loosely screwed in a right-hand thread of the frame-fixed cone 7 and is capable under the application of reverse power-pressure of screwing the base-wheel 12 into engagement with the rotatable cone 20 against the resistance of coil-spring $21^b$, fastened at one end in hole $21^c$ and at one end in hole $7^b$, which when the back power-pressure is released winds the cone 21 back to its initial position, leaving the base-wheel 12 fixed to the rotatable cone 20, as shown. While back pressure is maintained the drive and brake ring remains locked to the frame-fixed cone 5, and the cones 20 and 21 remain locked and fixed with the base-wheel between them, whether it be the cone 20 or the cone 21 that is extended, whereby power-pressure moves the driving-ring 13 and always applies the brake-power at the slow-speed movement, which gives the operator increased brake-power at all times of braking. Fixed between the rings 9 and 10 is a right-and-left acting dished spring-washer, divided, in order to fit it into the groove $12^c$, into bihalves 22 and 23, and the bulge may be pressed through from side to side, so that it assists to hold the base-wheel 12 in engagement with cone 20 or cone 21.

The operation is as follows: Forward movement of driving-ring 9 in the direction of arrow $9^a$ with the base-wheel rotatively fixed, as seen in Fig. 1, drives the hub and gear solid and free from friction of any stationary parts whatever, the wind and spread of the spiral bars of the spring drive and brake ring 17 making the power flexible. Upon stoppage of the driving-ring 9 the spring-ring 17 winds out of the ring 13 and becomes frame-fixed on cone 5, leaving the hub to run upon the ball-races 2 and 3 entirely free from frictional contact with the driving-gear or any stationary parts whatever. Upon reversal of the driving-ring 9 the planet-wheels 11 turn the base-wheel 12 forward, in the direction of the arrow, causing the transforming-cone 20 to screw it out into engagement with the frame-fixed transmitting-cone 21, wedging the two cones 20 and 21, whereupon the spiral bars of the spring-ring 17 may be forced up the distending-cone 18 until the frictional contact between the bars and the bore-face of the hub brings the overrunning hub to a stop. Owing to the base-wheel always being stopped in the braking action, the speed of the screwed ring 13 is always less than that of the driving-ring 9, which always gives the operator increased power in applying the brake. Immediately the back pressure is released the spring $20^b$ returns the cone 20, leaving the base-wheel 12 fixed to the frame-fixed cone 21. Upon resumption of a forward drive in the direction of the arrow the power is transmitted through the gear to the pivots of the screwed ring 13, which with the hub is driven at a speed less than that of the driving member 9, the power being rendered flexible in the manner aforesaid. To slip or cast the base-wheel back again from cone 21 to cone 20 when the driving-ring 9 is stopped, the spring drive and brake ring 17 runs onto the cone 5, and the application of back pressure then turns the base-wheel 12 in the direction of the arrow, screwing it into engagement with the cone 20, wedging and fixing the wheel 12 between the cones 20 and 21, at which point the hub may be braked, as aforesaid. Immediately the brake-pressure is released, the spring $21^c$ returns the cone 21, leaving the base-wheel 12 firmly fixed to the cone 20, again clutching or locking the whole of the members of the gear solid ready to convey the power direct to the hub 1, as aforesaid.

Having thus described the nature and objects of my invention, what I claim, and desire to secure by Letters Patent, is—

1. In a power-transmitting device of the character described, the combination of a hub, a flexible drive and brake band for applying driving or brake power to said hub or permitting the hub to overrun free of frictional contact with said band, a driver, means controlled by the driver for moving the flexible drive and brake band into driving or braking or overrunning relation to the hub, and a transforming device disposed intermediate the driver and said means for flexibly changing speed relation between the driver and said drive and brake band.

2. In a device of the character described, the combination of a hub, a flexible drive and brake band for applying driving or brake power to said hub, a driver, means controlled by the driver for moving the flexible drive and brake band into driving or braking or overrunning relation to the hub, and driving or braking the same, said means comprising a longitudinally-movable base wheel or gear and a transforming device said transforming device comprising a rotatable grip-cone and a frame-fixed grip-cone disposed on opposite sides of the said base wheel or gear and means for locking together or unlocking one or the other member of said transforming device with the said movable base-wheel with relation to the driver.

3. In a device of the character described, the combination of a hub, a flexible drive and brake band for applying driving or brake power flexibly to said hub, a driver, epicyclic differential gearing for transmitting power from the driver to the said flexible drive and brake band, said gearing comprising a base wheel or gear, a transforming device for rotatively fixing or frame-fixing said base-wheel with relation to and by the power of the driver, said transforming device comprising a rotatable grip-cone and a frame-fixed grip-cone disposed on opposite sides of said base wheel or gear.

4. In a device of the class described, the combination of a hub, a distending-cone, a flexible drive and brake band disposed about said distending-cone for applying driving or brake power flexibly to said hub, a driver, epicyclic gearing for transmitting the power of the driver to said flexible drive and brake band, said gearing including a base wheel or gear, movable longitudinally of its axis, a rotatable grip-cone, suitable means connecting said rotatable grip-cone and the aforesaid distending-cone and a frame-fixed grip-cone disposed on opposite sides of said base wheel or gear, and means for locking the base wheel or gear selectively to either of said cones.

5. In a device of the class described, the combination of a hub, a distending-cone, a flexible drive and brake band disposed about said distending-cone for applying driving or brake power flexibly to said hub, a driver, epicyclic gearing for transmitting the power of the driver to said flexible drive and brake band, said gearing including a base wheel or gear movable longitudinally of its axis, a rotatable grip-cone, suitable means connecting said rotatable grip-cone and the aforesaid distending-cone and a frame-fixed grip-cone disposed on opposite sides of said base wheel or gear, and a domed spring-disk attached to said base wheel or gear for locking it in engagement with either of said cones.

6. In a device of the character described, the combination of a hub, a movable distending-cone, a flexible drive and brake band spirally disposed about said cone for flexibly applying driving and brake power to said hub and entirely freeing the hub for overrunning, a spindle, a grip-cone thereon for engagement with the movable distending-cone, a driver, connections between the driver and flexible drive and brake band, said connections including epicyclic gearing having a base wheel or gear longitudinally movable upon said spindle, a transforming device comprising a rotatable grip-cone, suitable means connecting the said rotatable grip-cone and the aforesaid movable distending-cone and a frame-fixed grip-cone disposed on opposite sides of said base wheel or gear, and means under the control of the driver for engaging either of said grip-cones with the said base wheel or gear.

7. In a device of the character described, the combination of a hub, a flexible drive and brake band, a driver, a spindle, connections between the driver and flexible drive and brake band for flexibly driving or braking the hub or freeing the hub for overrunning, said connections including an epicyclic gearing having a base wheel or gear movable longitudinally on the said spindle, a rotatable grip-cone, suitable connecting means between said rotatable grip-cone and the aforesaid flexible drive and brake band and a frame-fixed grip-cone disposed on opposite sides of the base-wheel, screw-acting devices for moving the cones toward the base wheel or gear, and springs for retracting the cones.

8. In a device of the character described, the combination of a hub, a flexible drive and brake band, a driver, a spindle, connections between the driver and flexible drive and brake band for flexibly driving or braking the hub or freeing the hub for overrunning, said connections including an epicyclic gearing having a base wheel or gear movable longitudinally on the said spindle, a rotatable grip-cone, suitable connecting means between said rotatable grip-cone and the aforesaid flexible drive and brake band and a frame-fixed grip-cone disposed on opposite sides of the base-wheel, screw-acting devices for moving the cones toward the base wheel or gear, and springs for retracting the cones, and a spring-disk for holding the base wheel or gear in locking engagement with either of said cones.

In testimony whereof I have hereunto affixed my signature in the presence of two subscribing witnesses.

GEO. F. STURGESS.

Witnesses:
THOMAS SCOTT,
ERNEST FELL.